(12) United States Patent
Saruwatari et al.

(10) Patent No.: US 6,786,309 B2
(45) Date of Patent: Sep. 7, 2004

(54) ROTARY SHAFT BRAKE

(75) Inventors: Minoru Saruwatari, Calgary (CA);
Kevin Saruwatari, Calgary (CA)

(73) Assignee: Kudu Industries, Inc., Calgary (CA)

( * ) Notice: Subject to any disclaimer, the term of this patent is extended or adjusted under 35 U.S.C. 154(b) by 0 days.

(21) Appl. No.: 10/147,162

(22) Filed: May 16, 2002

(65) Prior Publication Data

US 2002/0175029 A1 Nov. 28, 2002

(30) Foreign Application Priority Data

May 22, 2001 (CA) ............................................ 2347942

(51) Int. Cl.⁷ .............................................. F16D 63/00
(52) U.S. Cl. ..................................... 188/82.9; 188/72.1
(58) Field of Search .............................. 188/72.1, 72.2, 188/72.3, 72.4, 82.1, 82.2, 82.3, 82.9, 264 R, 264 B, 264 D, 264 P; 417/214; 166/68.5, 76.1

(56) References Cited

U.S. PATENT DOCUMENTS

| | | | | |
|---|---|---|---|---|
| 2,953,222 A | * | 9/1960 | Waldron | 188/82.9 |
| 4,017,217 A | * | 4/1977 | Lamers | 417/214 |
| 4,465,169 A | * | 8/1984 | Houtz | 188/264 B |
| 4,799,575 A | * | 1/1989 | Kroniger | 188/72.4 |
| 5,358,036 A | * | 10/1994 | Mills | 188/71.2 |
| 6,386,333 B1 | * | 5/2002 | Russell | 188/264 P |

* cited by examiner

*Primary Examiner*—Thomas Williams
(74) *Attorney, Agent, or Firm*—Fulbright & Jaworski L.L.P.

(57) ABSTRACT

A brake assembly permits axial rotation of a shaft in a first direction and retarding axial rotation of the shaft in an opposite, reverse direction. The brake assembly includes a rotary member for mounting to and rotation with the shaft; a fluid actuated brake mechanism for retarding the rotation of the rotary member and consequently the shaft upon pressure build up in the brake mechanism; a bi-direction pump for conveying fluid from a reservoir, the pump being driven by rotation of the shaft; and a control manifold for directing circulating the fluid from the pump through the brake mechanism and back to the reservoir without pressure build up, the circulation of the fluid preventing the accumulation of gas in the brake mechanism, when the shaft turns in the first direction and or directing fluid to the brake mechanism for activating the brake mechanism by fluid pressure build up to retard rotation of the shaft when the shaft turns in the reverse direction.

25 Claims, 10 Drawing Sheets

PRIOR ART

PRIOR ART

ROTARY SHAFT BRAKE

FILED OF THE INVENTION

The present invention relates to hydraulic or fluid-activated brake assemblies and, in particular, to safety brake assemblies for drive strings which store energy as reactive torque by reason of being under torsional strain.

BACKGROUND OF INVENTION

Certain drive systems are subject to torque and large torsion (rotary strain) due to their length. As a result, they store a large amount of energy. When drive power to the system is interrupted, the torsion is released as back-spin and, if an uncontrolled release of torsional energy occurs, personal injury and/or property damage can result. For example, deep well submersible pumps such as progressing cavity pumps (PCPs) driven by sucker rod strings are commonly used to pump oil from deep wells. The drive strings of these submersible pumps usually have a relatively small diameter, typically of ¾ to 1⅛ inches. Such drive strings are commonly used in wells that vary from 1,500' to 6,000' in depth, 3,000' being a common average. Progressing cavity pumps include a stator which is attached to a production tubing at the bottom of a well and a rotor which is attached to a bottom end of the drive string. They are frequently used to pump viscous crude oil, often laden with sand or other impurities, which requires a large amount of torque. As a result, the elongated drive string is subject to considerable torsional strain. This torsional energy is stored in the elongated drive string as reactive torque. In a 3,000 foot string, as many as several hundreds of revolutions of torsion can be stored in the string if viscous sand laden crude oil is being pumped. When power is interrupted to the drive string, the torsional strain is released. Unless the release of torsion is controlled, costly and undesirable damage to equipment and/or personal injury to workmen in the vicinity can result. This is particularly true if an electric motor is used as a power source because such motors offer almost no resistance to reverse rotation when the power supply is interrupted.

Whenever drive power is interrupted to the drive string of a progressing cavity pump, the torsional strain is desirably released in a controlled fashion. Brakes which simply prevent the release of the torsion in the drive string are unsatisfactory for two reasons. First, it is preferable that in the case of an electric motor drive, the motor restart unattended when power is restored. In order to ensure a successful unattended restart, the motor must start without load. If the reactive torque is not released, the motor may not be capable of restarting and may be damaged as a result. Second, if pump repair or replacement is required any unreleased torsion in the drive string can be extremely dangerous for unaware workmen. Severe personal injury can result from the unintentional release of torsion in such drive strings.

Consequently, braking systems have been developed for control of the back-spin due to torsion in elongated drive strings. One system is a fluid brake that includes a pump engaged only when torsion is released from the drive string. The pump is used to circulate hydraulic fluid or lubricating oil from a reservoir through a restricted orifice. The resistance of the fluid created by the restriction serves to control the release of torsion. Nonetheless, this apparatus is subject to several disadvantages including excess heat production leading to potential lubricant breakdown, lack of adjustment to different load levels, and uneconomical size.

Other brake systems for controlling the release of torsion have been disclosed. Those brake systems are based on centrifugal braking principles. Examples of such braking systems are found in U.S. Pat. No. 4,216,848 which issued to Toyohisa Shiomdaira on Aug. 12, 1980; U.S. Pat. No. 4,797,075 which issued to Wallace L. Edwards et al on Jan. 10, 1989 and U.S. Pat. No. 4,993,276 which issued to Wallace L. Edwards on Feb. 19, 1991. The brakes disclosed in these patents are difficult to maintain due to internal mechanical components and require frequent maintenance when they are used to stop the reverse rotation of drive strings in a controlled manner. In addition, they are mechanically complicated and include custom-made moving parts which are costly to manufacture and expensive to keep in inventory. These brakes also tend to over-heat and burn out an oilwell progressing cavity pump system, because of the long brake cycle created by the fluid in the production tubing draining through the pump, which causes it to motor backwards and drive the drive string backwards for an extended period (up to 45 min).

A much improved brake system is known from U.S. Pat. No. 5,358,036 which issued to Robert A. R. Mills on Oct. 25, 1994. That patent discloses a relatively simple hydraulically operated disc brake mechanism which is self regulating and ensures that the torsional energy is completely dissipated in a controlled release. The brake mechanism permits axial rotation of a shaft in a first direction while retarding axial rotation of the shaft in an opposite direction. The brake mechanism includes a housing for the bearings of a downhole pump drive head which housing also functions as a reservoir for the lubricating oil for the bearings. The shaft drives a bi-directional hydraulic pump. When the shaft turns in an operating direction, the pump forces the lubricating fluid in a closed circuit through a filter and back to the reservoir. If normal operation is interrupted, and the torsion in the system is released, the bi-directional pump forces oil through a control manifold to a disc brake caliper which brakes a disc rotor mounted on the shaft. The faster the shaft turns as it releases torsion, the more braking force is applied. As the torsion is released, the reactive torque and the shaft speed drop and the brake force is correspondingly reduced until all torsion is released from the shaft, permitting safe handling and soft restart.

One problem encountered with this braking system is a build up of gas or vapour in the hydraulic circuit, especially the brake caliper of the disk brake, causing brake failure due to 'air lock'. This is caused, in the first instance, by air entrainment in the lubricating oil in the bearing/gear box of the well head by agitation of the oil by the bearings, and by the gears in the case of a right angle drive. As oil is continuously drawn from the bearing/gear box during operation of the drivehead, for the purpose of lubricating the top bearing, aerated oil is being circulated continuously through the hydraulic circuit manifold. Air tends to separate from the oil and accumulate at locations with little or no flow, such as the brake lines and brake caliper wherein no oil flows during forward rotation of the drive string. Although periodic manual bleeding of the brake caliper and flushing of the brake system will largely prevent these problems in deep well PCP systems, manual intervention is expensive and completely unacceptable in the deep well pumping field, where the customer demands complete reliability without manual intervention throughout the lifetime of the pump.

In the second instance, another source of gas and/or vapour that is a common problem of disc brakes under severe duty is excessive heat generated during the braking cycle causing the hydraulic fluid to boil and release vapour.

The developed gas will remain in the brake system and cause partial or complete brake failure, a condition known as vapour lock.

Thus, a disk brake system is required which overcomes these problems.

SUMMARY OF THE INVENTION

It is an object of the invention to provide a relatively simple, reliable brake system which is easy to maintain, the system permitting axial rotation of a shaft in one direction while retarding axial rotation of the shaft in the opposite direction and for substantially preventing brake fade caused by the accumulation of gas and or vapour in the hydraulic system.

It is a further object of the invention to provide a disc brake system for controllably releasing torsion stored in elongated drive strings even after extended periods of inactivation of the brake system.

It is another object of the invention to provide a means of cooling the caliper on disc brake systems and to keep the caliper and brake line clear of air, gas or vapour to prevent brake failure due to "air lock" and to reduce brake fade.

It is yet a further object of the invention to provide a brake system for elongated drive strings which releases torsion from the drive string in a self-regulated manner to ensure that the torsion is completely dissipated in a controlled release and which allows for the continuous selective release of accumulated gas from the brake system to reduce the occurrence of brake fade.

There is further provided in accordance with the invention a disc brake assembly for permitting axial rotation of a shaft in a first direction and retarding axial rotation of the shaft in an opposite direction, comprising:

a brake disc mounted on the shaft for rotation with the shaft;
  a hydraulic fluid actuated brake mechanism adapted to engage the brake disc and retard rotation of the disc and consequently to retard rotation of the shaft;
  a bi-directional pump for pumping hydraulic fluid from a reservoir, the pump being driven by the shaft;
  a control manifold for directing the hydraulic fluid from the pump back to the reservoir when the shaft turns in a first direction and for directing hydraulic fluid to the brake mechanism to retard rotation of the shaft when the shaft turns in the opposite direction; and
  means for preventing the accumulation of gas in the hydraulic system.

In accordance with another aspect of the invention, the hydraulic circuit further includes a venting system for continuously venting accumulated gas from at least one of the brake caliper and the brake manifold.

The means for preventing the accumulation of gas and/or vapour within the braking system, preferably includes:

a hydraulic circuit which continuously circulates oil through the brake caliper while the drivehead is in forward motion, thereby preventing accumulation of air in the brake circuit and caliper while the drivehead is in forward motion, so that the whole braking system is continuously flushed when the drivehead is operating in the forward direction.

In accordance with a further aspect of the invention there is provided a self-regulating disc brake assembly for controllably releasing torsional energy stored in an axially rotatable elastic member under torsion, comprising:

a shaft coupled with the elastic member to be axially rotatable with the elastic member in either direction;
  a brake disc mounted on the shaft for rotation with the shaft;
  a fluid actuated brake mechanism adapted to engage the brake disc and retard rotation of the brake disc and consequently to retard rotation of the shaft and the elastic member;
  a bi-directional pump for pumping fluid from a reservoir, the pump being driven by the shaft;
  a control manifold for directing the fluid from the pump through the brake mechanism back to the reservoir when the elastic member turns in a first direction and induces torsion in the member, and for directing fluid to the brake mechanism while substantially preventing flow through the brake mechanism, when the elastic member stops turning in the first direction and built-up torsion is released from the elastic member under torsion.

In accordance with the further aspect of the invention there is provided a self-regulating disc brake assembly for controllably releasing torsional energy stored in a drive string for a down hole submersible pump in a well, comprising:

a shaft coupled with the drive string and rotatable therewith;
  a reservoir surrounding and rotatably supporting the shaft;
  a coupling for connecting the reservoir to a wellhead assembly of the well;
  a brake disc affixed to the shaft and rotatable therewith;
  a fluid actuated brake caliper that straddles the brake disc for engaging the brake disc and retarding rotation thereof, and consequently for retarding rotation of the shaft and the drive string;
  a bi-directional pump for pumping fluid from the reservoir, the pump being driven by a gear attached to the shaft;
  a control manifold for directing the fluid from the pump through the brake caliper to the reservoir when the drive string is driven in a direction to drive the down hole pump, and for directing fluid to the brake caliper while substantially preventing flow therethrough when the drive string is no longer driven and torsion is released from the drive string to turn the shaft in an opposite direction.

In accordance with another aspect of the present invention, the assembly further includes a pressure regulating valve down-stream of the brake caliper for controlling back-spin speed during the braking cycle. The pressure regulating valve is preferably operative over the whole range of pressures possible during operation of the assembly and functions to pre-set the back-spin speed within narrow limits by controlling the pressure on the brake pads. This is achieved by the pressure regulating valve releasing a fractional stream of the brake activating fluid back to the reservoir, thereby not only keeping the system cleared of vapour, but also cooling the caliper during the brake activation cycle.

The invention therefore provides a simple self-regulating brake mechanism which safely and controllably releases torsion from an elastic member and, in particular, from elongated drive strings used to drive down hole submersible pumps such as progressing cavity pumps.

The disc brake in accordance with the invention is adapted for use in any environment where a shaft is permitted to rotate freely in one direction but must be inhibited from uncontrolled rotation in the opposite direction. The brake is a self-regulating motion arrester, not a static brake system. In other words, the faster a shaft rotates in the inhibited direction, the more braking pressure is applied up to a preselected maximum braking pressure. As the motion of the shaft is retarded, the braking pressure is accordingly reduced. When the shaft loses all momentum, the brake caliper releases the brake pads from the brake disc and the shaft is free to commence rotation in either direction.

In accordance with the preferred embodiment, the brake caliper is mounted to a reservoir which surrounds the shaft. The bi-directional pump is preferably mounted on the reservoir and exposed for ready access. The fluid in the reservoir is preferably a lubricating oil. The preferred embodiment is further provided with a fluid filter to continuously filter the lubricating oil in the reservoir.

The principle taught herein of continuously flushing air out of the brake actuating fluid and cooling the brake caliper by directing a flow of fluid through the brake, even when the brake is actuated, may be applied to any braking application.

BRIEF DESCRIPTION OF THE DRAWINGS

The invention will now be described by way of example only and with reference to the following drawings, wherein.

DETAILED DESCRIPTION OF THE PREFERRED EMBODIMENTS

The disc brake assembly in accordance with the invention is useful for controlling the back-spin of drive strings which store reactive torque due to torsional stress, such as the sucker rod strings used to drive submersible down hole pumps. However, the disc brake assembly is not limited to that application and may be used in conjunction with any shaft which is subject to torsion that must be safely and controllably released. For purposes of illustration only, the disc brake assembly in accordance with the invention is described in conjunction with a mounting suitable for use with a sucker rod string typically used to drive a submersible down hole pump such as a progressing cavity pump.

Figure 1:
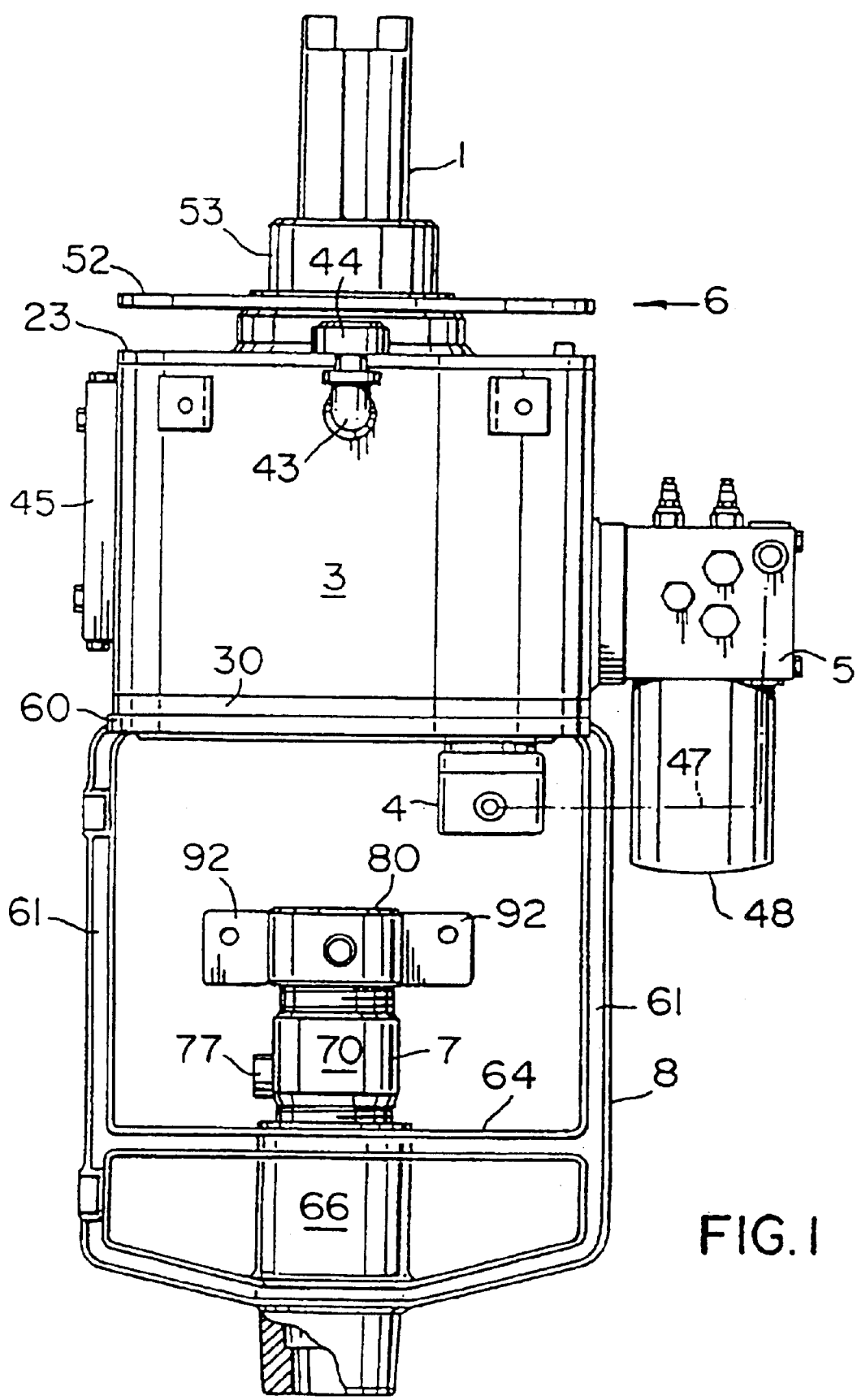
FIG. 1 is a front elevational view of a disc brake assembly on a drive head in accordance with the invention mounted on a support yoke suitable for use with a down hole submersible pump drive string.
Figure 2:
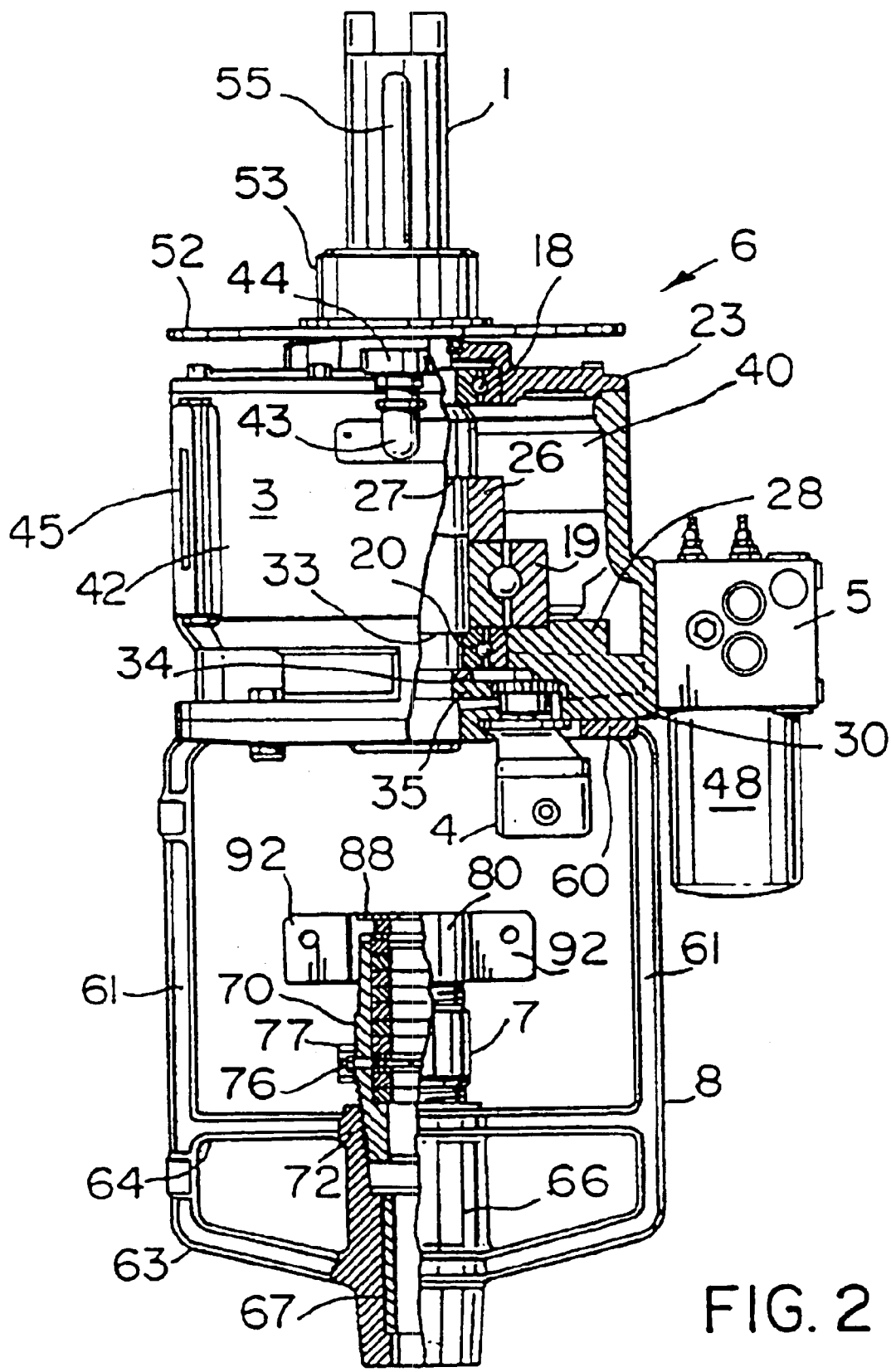
FIG. 2 is a partially cut away view of a second embodiment of the disc brake assembly shown in FIG. 1.
Figure 3:
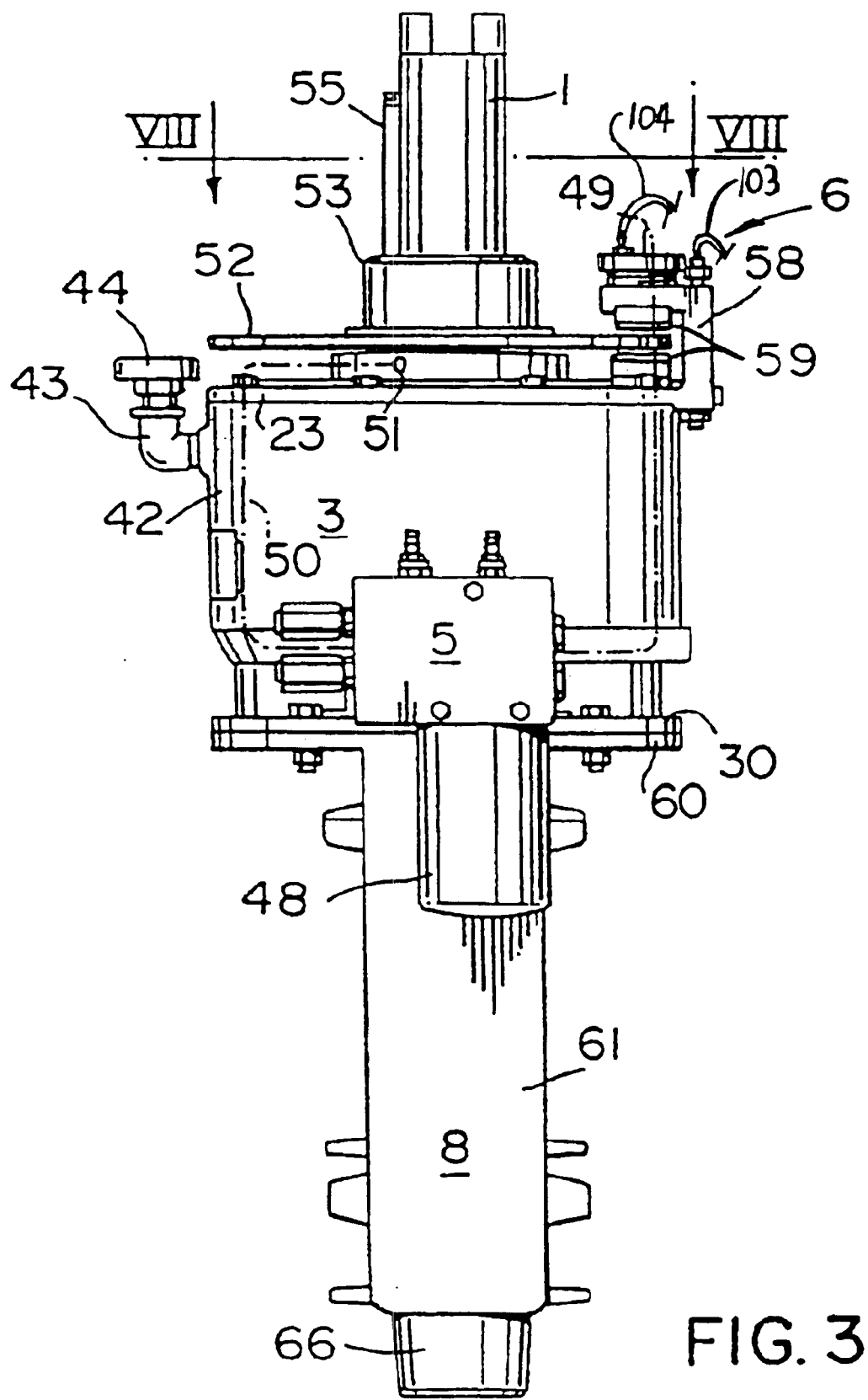
FIG. 3 is a side elevational view of the disc brake assembly shown in FIG. 2.

FIGS. 1 and 2 show front elevational views of two embodiments of the invention which differ only in external configuration. FIG. 3 shows a side elevational view of the embodiment shown in FIG. 2.

The invention generally comprises a housing 3 which forms a primary fluid reservoir 40 (see FIG. 2) from which a fluid, preferably a lubricating oil, is pumped by a bi-directional hydraulic pump 4 to a control manifold 5. When a sleeve 1 (see FIG. 2) which drives the bi-directional pump 4 turns in a first direction (forward direction), the control manifold 5 directs fluid through a disk brake assembly 6 and back to the reservoir 40. In that operational state, the control manifold permits free flow of fluid through the brake system so that no pressure build-up occurs in the brake assembly and the brake is inactive. Furthermore, the continuous flow of fluid through the brake system flushes the brake system and prevents any accumulation of gas pockets in the brake system which could cause brake fade. When the sleeve I turns in an opposite direction (back-spin direction), the bi-directional hydraulic pump 4 pumps fluid to the control manifold 5 through a separate fluid transmission line and the control manifold 5 directs the fluid to the disc brake assembly 6, while preventing free flow therethrough. The brake assembly includes a hydraulic brake caliper 58 (see FIG. 3) that straddles a brake disc 52 which is connected by a key 55 to the sleeve 1, as will be explained below in more detail. The resulting fluid pressure build-up in the caliper 58 then forces brake pads 59 into contact with the brake disc 52. Thus, the rotation of the sleeve 1 in the opposite direction is retarded so that a shaft or rod 2 (see FIG. 4) extending through and keyed to the sleeve 1 cannot spin uncontrollably in the second direction.

As the backspin motion of sleeve 1 and, thus, shaft 2 is slowed, the fluid pressure output by the pump 4 is likewise decreased and the pressure on the brake pads 59 and the braking force is correspondingly reduced so that the shaft is once again permitted to backspin. The backspin then again causes an increase in fluid pressure to the brake caliper 58 which forces the brake pads 59 into stronger contact with the brake disc 52 and the braking action is resultingly increased. This cycle of braking, shaft slowdown, reduced braking, shaft acceleration and renewed braking automatically repeats until all the torque stored in the shaft is released. Thus, a safety brake mechanism which operates in a self-regulating control loop to release stored torque is provided.

The housing 3 is mounted to a yoke 8 (see FIG. 2) which includes an annular top ring 60, a pair of side columns 61 which extend downwardly from the top ring 60, a bottom bar 63 that is integral with the side columns 61 and a crossbar 64 that is also integral with the side colums 61 and extends between them. The bottom bar 63 and the crossbar 64 are connected by a web which forms an I-beam to support the weight of a sucker rod string (not illustrated) used to drive a down hole submersible pump (not shown). The bottom bar 63 and the crossbar 64 are also integrally formed with a sleeve 66 for receiving a polished rod 2 (see FIG. 5) that passes through a split bushing 67 (FIG. 2). A stuffing box 70 threadingly engages a top end 72 of the sleeve 66. The stuffing box 70 provides a fluid seal around the polished rod 2 that is connected to a top end of the sucker rod string. The stuffing box is constructed in a manner well known in the art and includes packing rings which are retained by a cap 80 that includes a lip seal retainer plate 88 and tightening lugs 92. Lubrication of the polished rod in the stuffing box is provided by grease introduced through a grease nipple 76 which is protected by sleeve 77. The yoke 8 threadingly engages a top end of a wellhead assembly (not illustrated)

using an external thread on the bottom end of the sleeve 66. The wellhead assembly therefore supports the yoke 8 and the housing 3 as well as the weight of the sucker rod string, as will be explained below in more detail.

The polished rod 2 extends upward through the sleeve 66 and an axial bore in the sleeve 1 which extends through the housing 3. The housing 3 includes a top wall 23 and a bottom wall 30 to define a fluid reservoir 40 that provides a fluid bath for bearings that rotatably support the sleeve 1. The housing 3 is vented by an elbow 43 that supports a breather 44 to maintain atmospheric pressure within the housing 3. A fluid level gage 45 affixed to a side wall 42 of the housing 3 provides a visual indication of a fluid level within the housing. The bi-directional hydraulic pump 4 is driven by a spur gear 35 which is affixed to the sleeve 1. The spur gear 35 engages a complementary spur gear 46 (see FIG. 6) mounted to an impeller shaft of the bi-directional pump 4.

Figure 4:
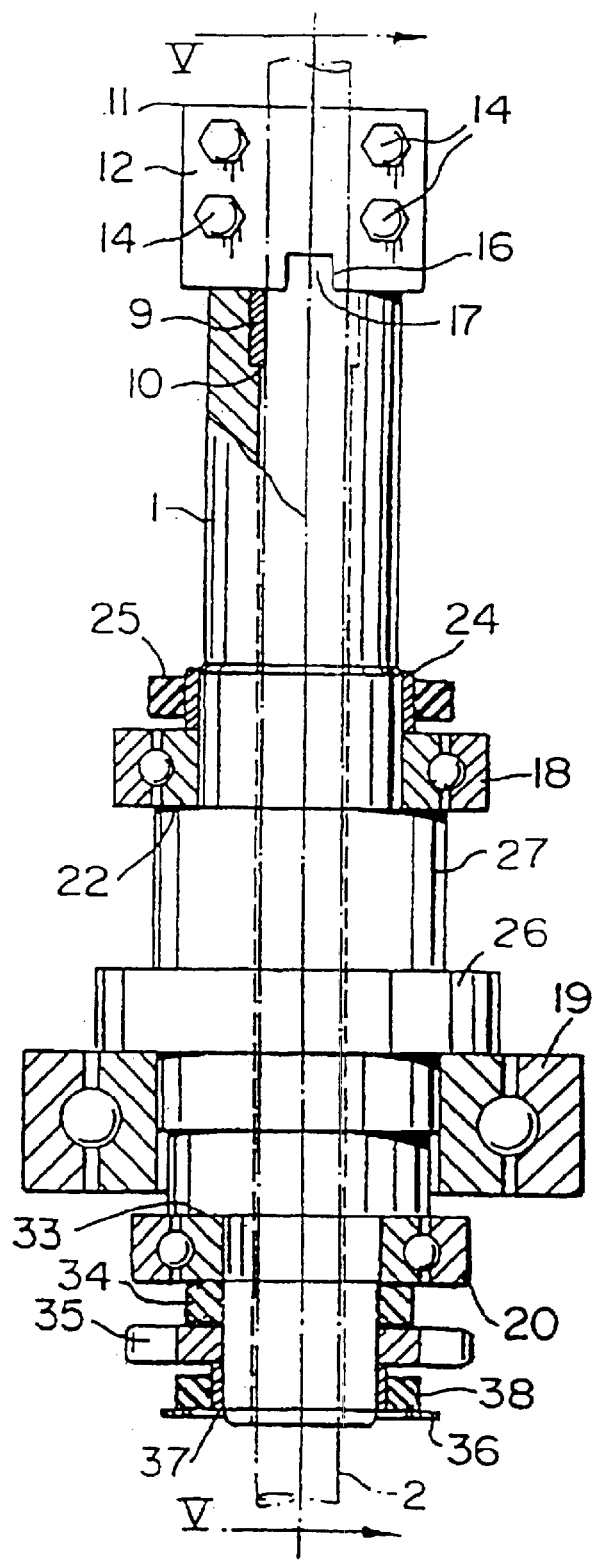
FIG. 4 is a cross-sectional detailed view of the shaft support assembly taken along lines VIII—VIII of FIG. 3.

FIG. 4 shows a cross-sectional view of the support bearings for the sleeve 1. A bushing 9 is provided on an internal shoulder of an axial bore which extends through the sleeve 1. The bushing 9 centers the polished rod 2 in the shaft. The polished rod 2 is typically connected to the sleeve 1 by a polished rod clamp 11, well known in the art. The polished rod clamp includes two clamp parts 12 which are interconnected by bolts 14 and nuts 15 (see FIG. 5). Each clamp part 12 includes a notch 16 for receiving a complementary projection 17 on a top end of the sleeve 1. Thus the sleeve 1 is keyed into the clamp 11 for rotation therewith and the sleeve 1 rotates in direct correspondence with the rotation of the polished rod 2.

The sleeve 1 is rotatably supported within the housing 3 by a thrust bearing 19 which bears a thrust collar 26 (FIG. 4) that is supported by a shoulder 27 on the sleeve 1. A thrust ledge 28 (see FIG. 2) which extends upwardly from the bottom wall 30 of the housing 3 supports the thrust bearing 19 and consequently the sleeve 1. A bottom radial bearing 20 is sandwiched between the shoulder 33 on the sleeve 1 and a spacer ring 34 which abuts the spur gear 35 and a retaining ring 36. A wear sleeve 37 isolates a fluid seal 38 from the sleeve 1. The fluid seal 38 seals the housing 3 around the bottom end of the shaft. A wear sleeve 24 isolates a fluid seal 25 from the sleeve 1. The fluid seal 25 seals a top end of the housing 3 so that the housing defines the fluid reservoir 40 (see FIG. 2).

Figure 5:
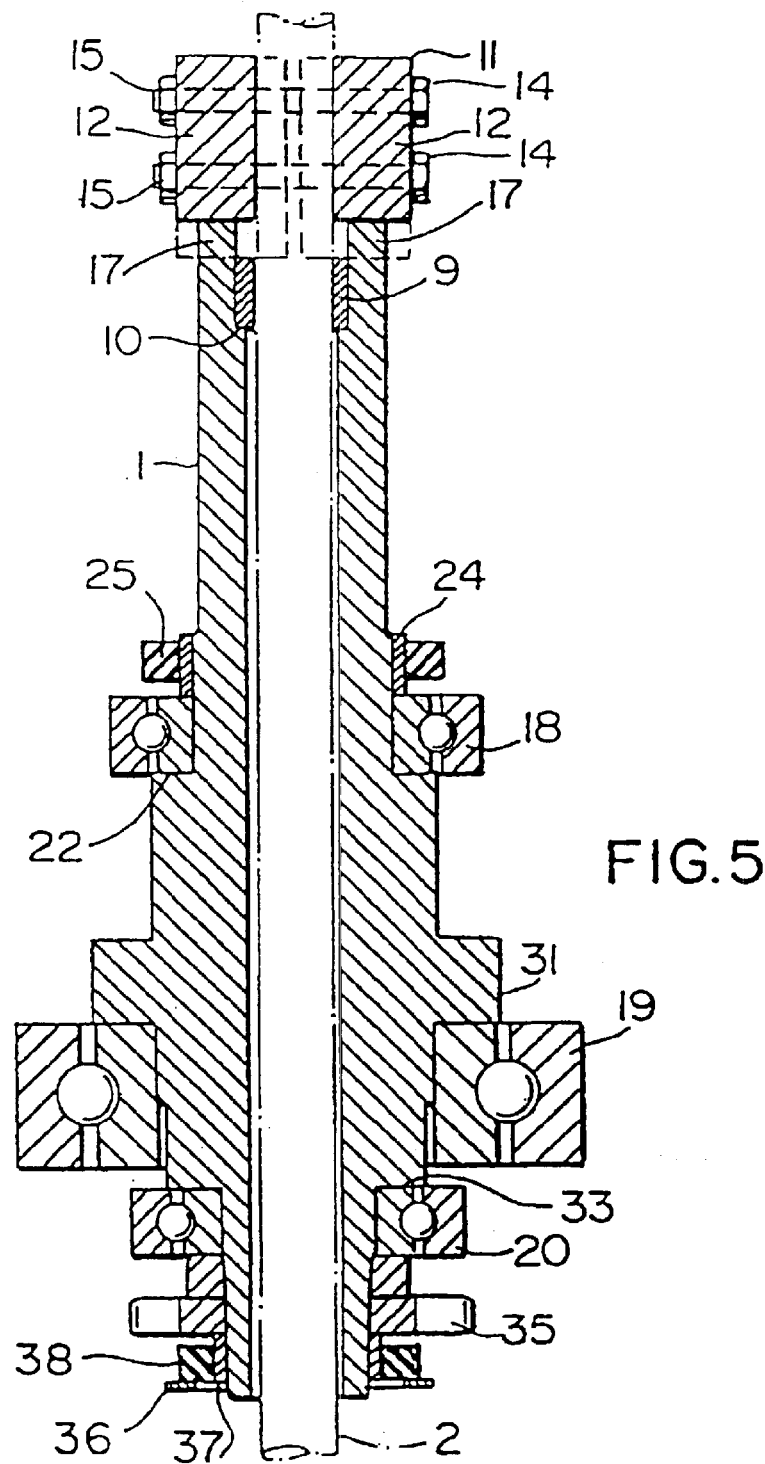
FIG. 5 is a cross-sectional view taken along lines V—V of FIG. 4.

FIG. 5 shows the polished rod 2 extending through the axial bore in the sleeve 1. The bushing 9 which rests on the internal shoulder 10 in the axial bore of the sleeve 1 centers the polished rod in the axial bore. Different sized polished rods 2 may be accommodated by using a bushing 9 having a correspondingly sized internal diameter.

Figure 6:
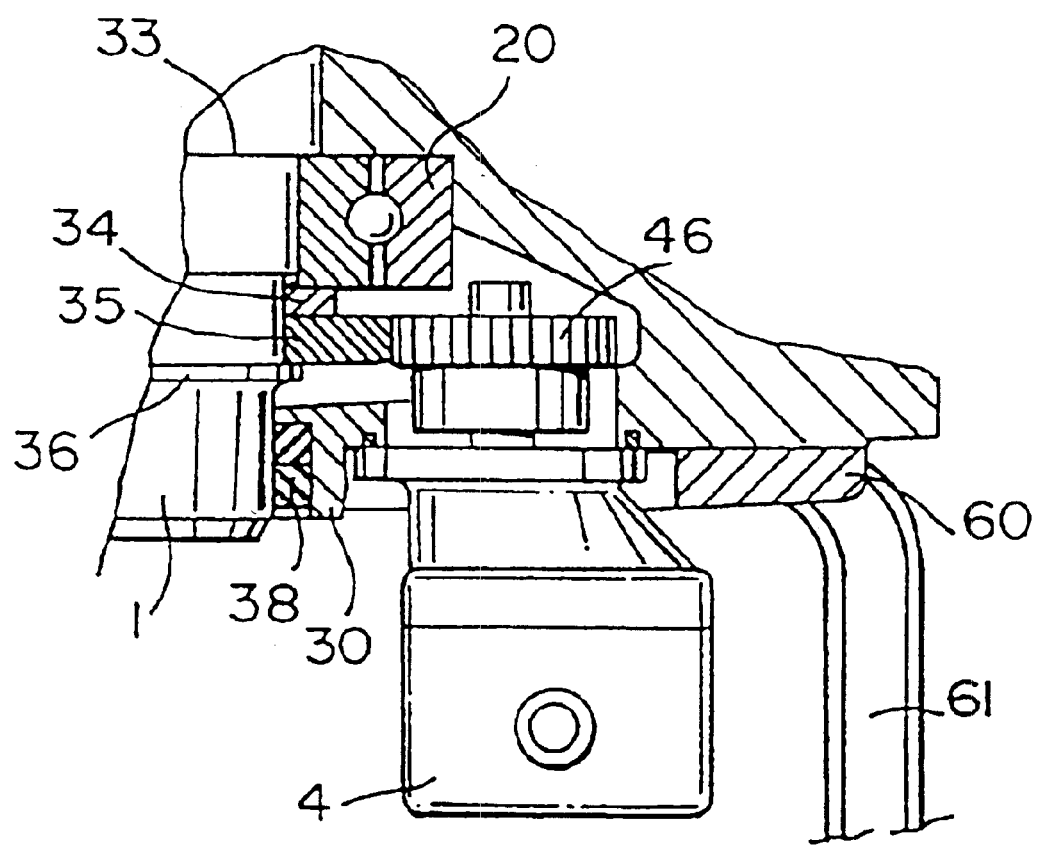
FIG. 6 is an enlarged view of the hydraulic pump shown in FIGS. 1 and 2.

FIG. 6 shows a detailed view of the lower right hand corner of the housing 3, and in particular, the bi-directional hydraulic pump 4. As noted above, the spur gear 35 affixed to the sleeve 1 drives a complementary spur gear 46 affixed to an impeller shaft of the bi-directional hydraulic pump 4. The pump impeller (not illustrated) therefore rotates in correspondence with the sleeve 1. The bi-directional hydraulic pump 4 is mounted to the bottom wall 30 of the housing 3. A gasket (not illustrated) provides a fluid seal between a mounting flange of the bi-directional hydraulic pump 4 and the bottom wall 30 of the housing 3. The bi-directional hydraulic pump 4 is therefore readily accessible for repair or replacement.

Figure 7:
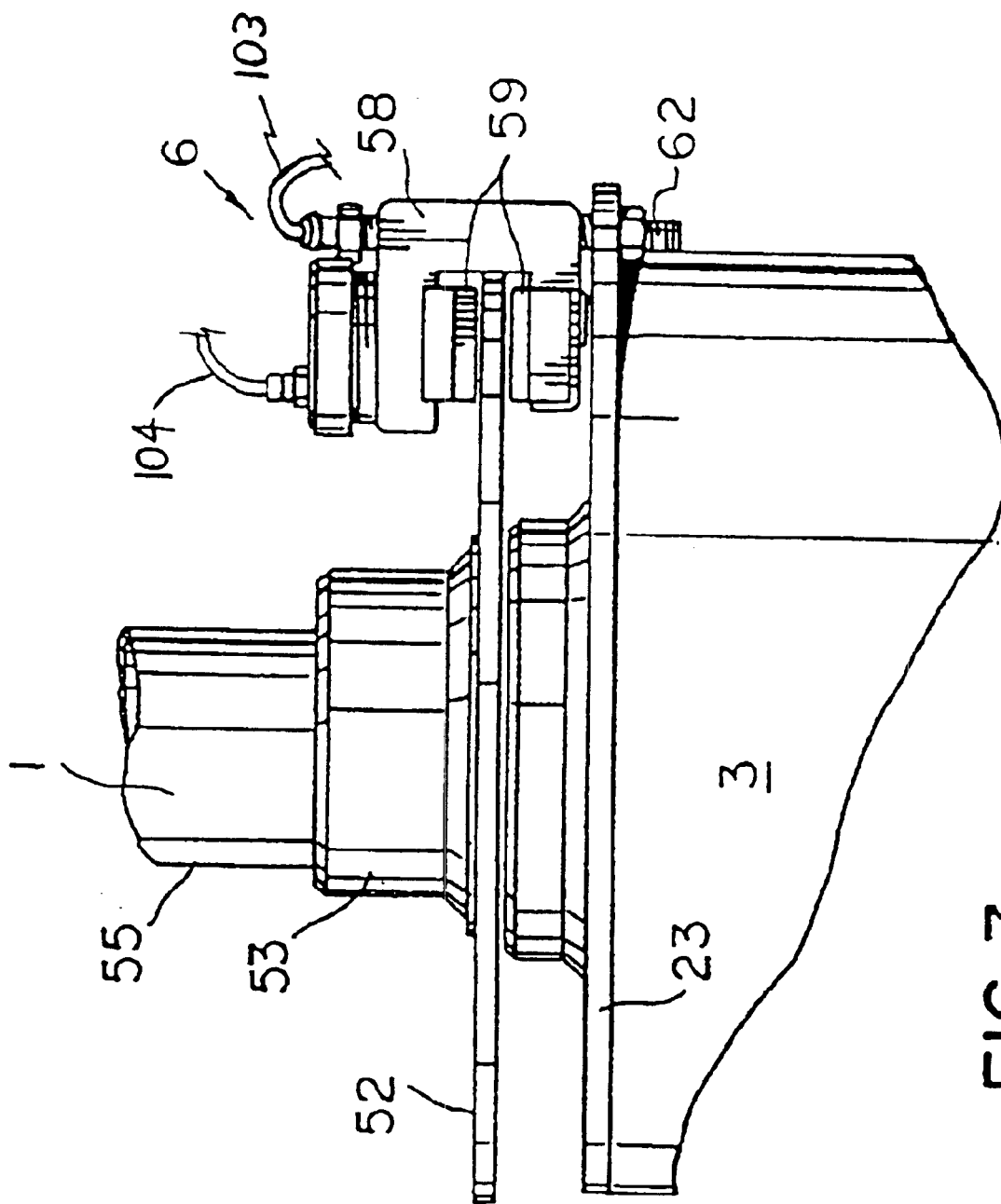
FIG. 7 is an enlarged elevational view of a top end of the disc brake assembly shown in FIG. 3.

FIG. 7 shows a detailed view of the brake mechanism 6. As described above, the brake mechanism 6 includes a brake disc 52 and a caliper 58. The caliper 58 is preferably a brake caliper of a type commercially available from MICO INCORPORATED, North Markoto, Minn., U.S.A. It is mounted to a projection of the top wall 23 of the housing 3 using bolts and nuts 62 in a manner recommended by the manufacturer. Hydraulic fluid is directed from the bi-directional hydraulic pump 4 to the brake caliper 58 by the control manifold 5 and through fluid transmission lines 103 and 104, respectively attached to the pressure feed inlet and venting nipple seat of the caliper. The venting nipple normally included in the commercially available caliper is removed to allow a continuous cross flow of fluid through the brake caliper. When the shaft is backspinning, the control manifold 5 at least partially blocks the cross flow of fluid through the brake caliper 58 so that fluid pressure builds up in the caliper which extends the brake pads 59 into contact with opposite sides of the rotor disc 52 and braking action is thereby transmitted to the sleeve 1. The braking control and sequence are explained in detail below with reference to FIG. 9.

Figure 8:
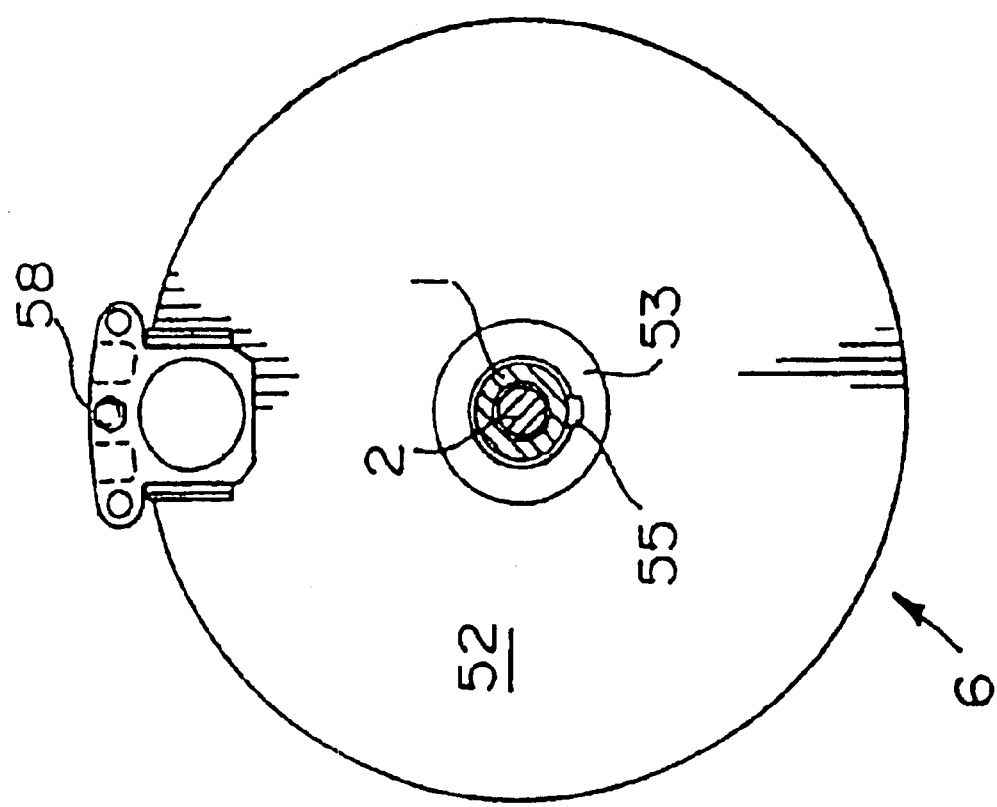
FIG. 8 is a top plan view of the disc brake assembly shown in FIG. 7.

FIG. 8 shows a top plan view of the brake mechanism 6. The brake disc 52 is affixed to the shaft 2 by a square key 55 which engages complementary key ways in a hub 53 of the brake disc 52 and the sleeve 1. The brake disc 52 therefore turns in direct correspondence with the sleeve 1 and the rod or shaft 2 keyed thereto (FIG. 4).

Figure 9:
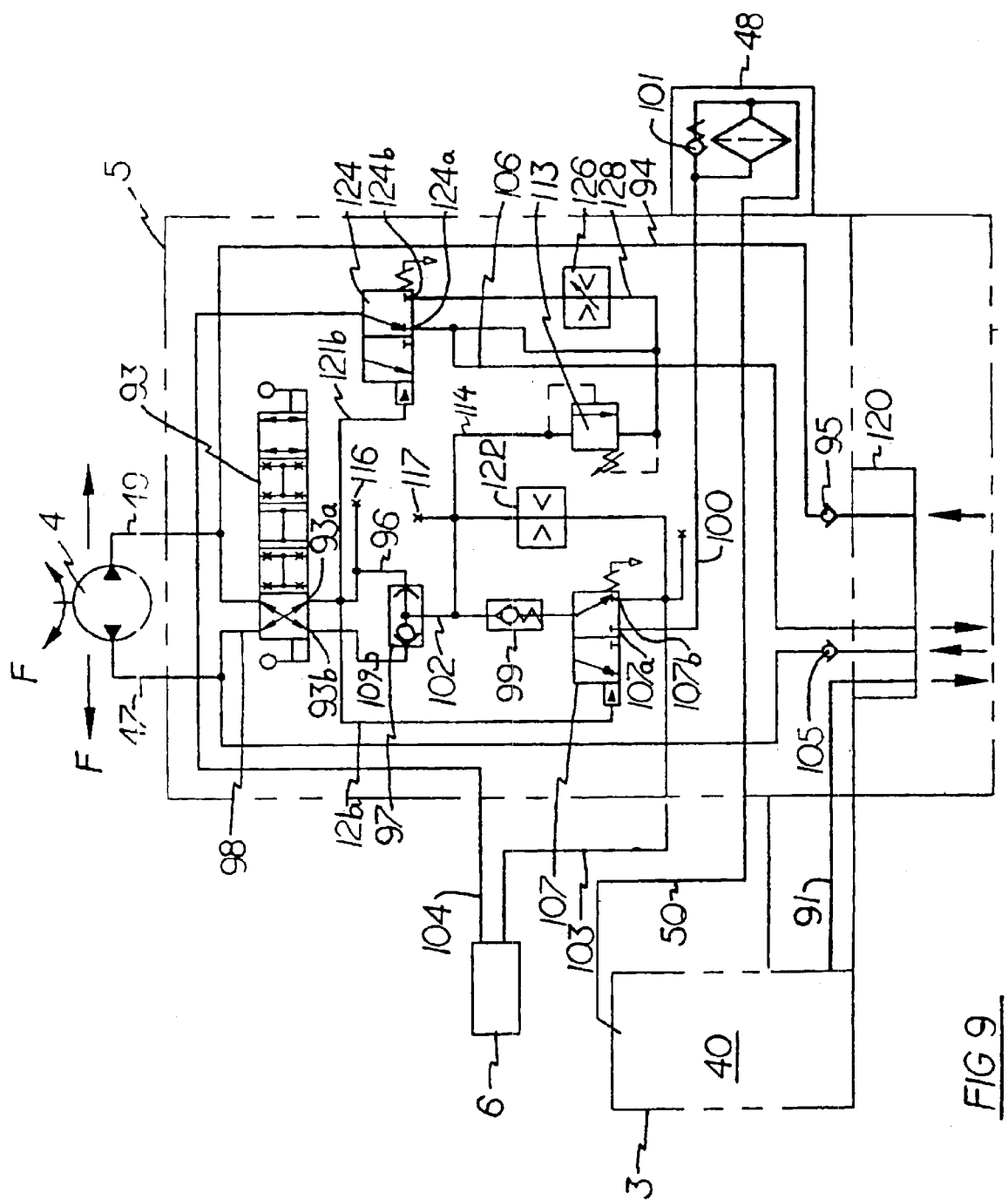
FIG. 9 is a schematic diagram of the hydraulic circuitry of a preferred embodiment of the disc brake assembly in accordance with the invention, illustrating the operation thereof during forward rotation of the shaft.

FIG. 9 is a schematic diagram of the hydraulic circuit that controls the brake mechanism in accordance with the invention. The primary fluid reservoir 40 defined by the housing 3 preferably contains a lubricating oil for lubricating the bearings 18, 19 and 20 (see FIGS. 2, 4 and 5). The control manifold 5 includes a secondary fluid reservoir 120 directly connected to the primary fluid reservoir 40 by a fluid conduit 91 that keeps the secondary fluid reservoir 120 full. When the sleeve 1 is turning in a normal operational direction (forward direction; F), oil is drawn from the secondary fluid reservoir 120, through the check valve 95, conduit 94 in the control manifold 5 and external line 49 to the pump 4. Many different bi-directional hydraulic pumps can be used in this embodiment and are commercially available, for example from Barnes Corporation. The preferred type of check valve 95 is a flat disk check valve (Hawe, Germany) which is closed by pressure in transmission line 94. The fluid is pumped through external line 47 to the function selector valve 93 which is a rotary flow selector valve located in the control manifold 5 and used for switching the hydraulic circuit between an operating condition as discussed in the following and a testing function for testing of the braking system, which testing function will be discussed further below. The fluid exits the selector valve 93 at 93a. Thence, the fluid flows through line 96 and operates shuttle check valve 97 (Vickers Corporation) to the position shown. The pump builds up pressure in the fluid against a spring-loaded check valve 99 and the pressure shifts the flow directing valves 107 and 124 by means of conduits 12a and 12b (valves 107 and 124 are shown in the 'at rest position', i.e. before being shifted). The check valve 99 is pre-set to open at a preselected pressure, for example 65 psi. The fluid exits shuttle check valve 97 through conduit 102 and the fluid flow is split. A smaller amount of fluid flows through a fixed orifice 122 to brake caliper 6, through external line 103. It exits brake caliper 6 through external line 104 and is routed through the manifold to flow directing valve 124 (now shifted). This flow exits flow directing valve 124 at port 124a and flows through conduit 106 to secondary fluid reservoir 120. A larger amount flows through spring-loaded check valve 99 (once the pre-set pressure has been overcome) through flow directing valve 107 (now shifted), exiting at port 107a. Thence it flows through conduit 100 to filter 48 and returns through external line 50 to the reservoir 40. The oil filter 48 is preferably of a type commercially available from Chrysler Corporation or Kralinator Corporation, which includes a check valve 101 designed to bypass the filter if it becomes clogged or otherwise obstructed. The oil returned to reservoir 40 by fluid transmission line 50 (see FIG. 3) is preferably pumped through an orifice 51 in the top wall 23 of the housing 3 so that the returned fluid impinges directly on the top radial bearing 18, thereby ensuring that the bearings 18, 19 and 20 are respectively lubricated even if the fluid level in the fluid reservoir 40 is low.

Thus, in the brake assembly of the present invention during forward rotation of the pump 4, fluid is conveyed in a primary closed loop from the housing 3 to the secondary reservoir 120 and through the pump 4 and the filter 48 back to the housing 3. In a parallel closed loop, the fluid is conveyed at the same time from the pump 4 through the brake caliper 6 back to the secondary reservoir 120. The oil is continuously filtered and the brake caliper and conduits and lines thereto are continuously flushed while the drivehead is operating in the forward direction.

Figure 10:
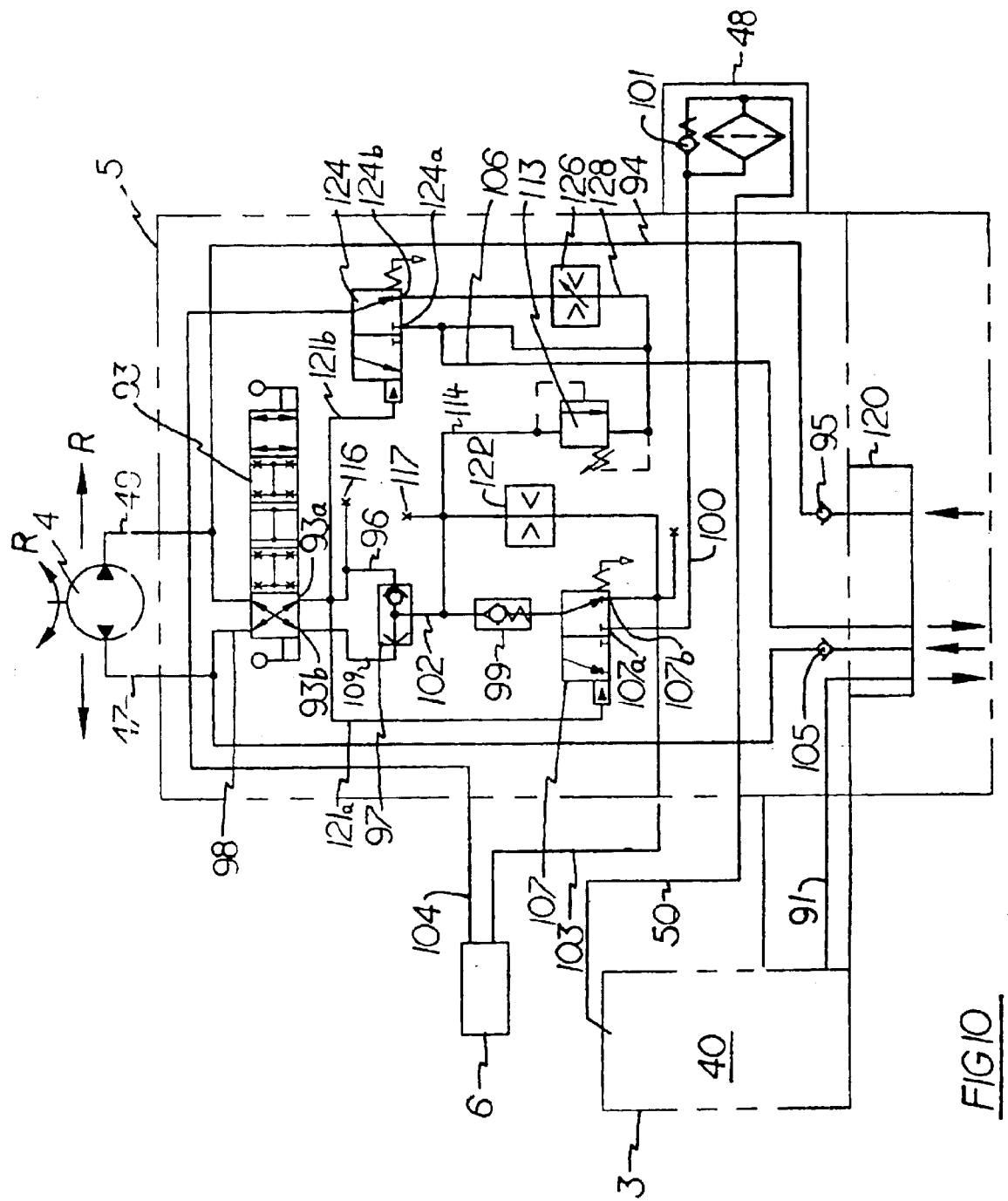
FIG. 10 is a schematic diagram of the hydraulic circuitry of a preferred embodiment of the disc brake assembly in accordance with the invention, illustrating the operation thereof during back-spin of the shaft.

If normal drive power to the sleeve 1 is interrupted, torsion stored in the sucker rod string keyed thereto (not illustrated) may cause the polished rod 2 and, consequently, the sleeve 1 (see Figs. 4 and 5) to back-spin at destructively high speeds which creates a hazardous situation. The propelling force is the torsion in the sucker rod string which string is used to transmit torque to the down hole submersible pump (not illustrated). The operation of the brake assembly and especially the control manifold 5 upon backspin of the sleeve 1 will now be discussed by reference to the schematic hydraulic circuit diagram of FIG. 10. When the drive head begins to rotate in an opposite direction (backspin or reverse direction; R), the reversible hydraulic pump 4 is turned in the opposite direction by the spur gear 35 (see FIG. 6) and oil is drawn from the secondary reservoir 120 through flat disc check valve 105 in the manifold 5 and thence through internal conduit and external line 47 to the pump 4. The fluid is pumped through external line 49 through the selector valve 93 (the function of which will be described below) and exits at port 93b. The flow operates the shuttle check valve 97 to the position shown on FIG. 10, which prevents pressure from being transmitted to the flow directing valves 107 and 124 and they remain 'at rest' as shown. The flow is directed through line 102, spring-loaded check valve 99 and flow directing valve 107, exiting at port 107b and thence through external line 103 to brake caliper 6. The flow exits the brake caliper 6 through external line 104 and is routed through conduit 104 in manifold 5 to flow directing valve 124 (which is at rest). The fluid exits the latter at port 124b and then flows to adjustable flow controller 126. Adjustable flow controller 126 is preset to a preselected flow rate and attempts to maintain this flow rate over the range of pressure from 0 to 2000 psi (which is the pressure at which the pressure relief valve will open). Thus, when back-spin speed increases causing the volume conveyed by the pump 4 to increase, the flow control valve will control the flow by reducing the orifice and the back-pressure will increase, which increases the braking force. The opposite occurs when the speed decreases. Appropriate flow rates through the flow control valve are dependent on the activation pressure required for the specific brake caliper respectively used, but will be readily apparent from the specification data of the pump 4 and the flow control valve 126. Thus, the back-spin speed will fluctuate, but within narrow limits predetermined by the setting of the flow control valve 126. A typical example is 100 rpm +/−5 rpm until sufficient torsion has been released that there is insufficient torque to cause the drivehead to backspin at the rate required to pump fluid at the predetermined flow rate setting of the flow control valve 126, at which point the flow control valve 126 will open to its maximum setting and the remaining torsion (corresponding to low torque) will be released unimpeded. Suitable types of flow control valves will be apparent to the person skilled in the art. One type of valve which can be used for this purpose is commercially available under the designation flow controller from Vickers, Corporation. From the flow control valve 126, the fluid flows through conduit 106 returning to the secondary reservoir 120. Thus, there is flow through the brake caliper 6 and the external lines and conduits leading thereto, which cools the caliper, thereby preventing overheating of the brake fluid and the creation of vapour-lock which is a major cause of brake fade.

A pressure relief valve 113 is provided in a fluid transmission line 114 that extends between the output of the shuttle valve 97 and the fluid transmission line 106 and protects the hydraulic control circuit from excess fluid pressures.

The system is "fail safe", because failure of the flow directing valves or the shuttle-check valve to shift will result in activation of the brake.

Although the brake assembly described above represents a preferred embodiment of the invention, a modified version of the brake assembly would still achieve the object of substantially preventing vapour lock upon brake activation. As discussed above, vapour lock occurs when gas or vapour accumulates in the hydraulic circuit at locations of little or no brake fluid flow, such as parts of the manifold, the brake lines and the brake caliper. This is prevented by continuous circulation of the brake fluid through the manifold, the brake lines and the brake caliper during forward rotation of the shaft associated with the braking assembly. Another reason for gas or vapour in a hydraulic brake system is over-heating (boiling) of the brake fluid. This is prevented in the preferred embodiment described above by still permitting a small 'bleed flow' of brake fluid through the brake caliper even when the brake is activated, i.e. upon backspin of the shaft. This is preferred for applications such as deep well PCP applications where a large amount of energy is stored in the shaft and back-spinning of the shaft may be prolonged due to reverse motoring of the pump (draining of liquid in production tubing through the pump). However, it is conceivable for other applications where uncontrolled back-spinning of a shaft most be prevented that amount of energy stored in the shaft during forward rotation is not sufficient to lead to overheating of the brake fluid upon activation of the brake assembly. In those applications, it may be sufficient for the brake assembly to permit flushing of the brake circuit and caliper during forward rotation of the shaft, while completely stopping the flow of fluid through the brake caliper for activation of the brake upon reverse rotation of the shaft. In such a modified brake assembly, the adjustable flow controller 126 may be omitted completely and replaced with a plug or end cap at port 124b.

Gage ports 116, 117 and 127 are provided on lines 96, 114 and 103 respectively. The gage ports 116, 117 and 127 are equipped with quick disconnect fittings so that fluid pressure readings can be taken for diagnostic purposes. Furthermore, the rotary function selector valve 93 is used to switch the control manifold 5 between a Run mode as described above and a Test mode described in the following. As mentioned above, fluid transmission lines 47 and 49 are connected to the fluid transmission lines 96 and 109 respectively by the selector valve 93 in the Run position thereof. When the selector valve is rotated from the Run position schematically illustrated in FIGS. 9 and 10, to a Test position (not shown), the connections of the fluid transmission lines 47 and 49 through the selector are reversed so that line 47 becomes connected to line 109 and line 49 to line 96. This allows a testing of the brake assembly while the shaft and the pump are rotating in the operational (forward) direction and obviates the necessity to shut down production of the pump for testing of the safety brake assembly, thereby significantly reducing the time and cost involved in periodic brake testing. The rotary selector valve 93 is located in the circuit such that the entire manifold, external lines, caliper and pump are tested. The test feature is a safety feature that allows a test of the complete brake system before shut-down, which usually has to be done by personnel in close proximity to the drivehead.

It will be readily understood by those skilled in the art that changes and modifications to the above-described embodiments may be made without departing from the scope of the invention. The scope of the invention is therefore intended to be limited solely by the scope of the appended claims.

We claim:

1. A brake assembly for permitting axial rotation of a shaft in a first direction and retarding axial rotation of the shaft in an opposite, reverse direction, the brake assembly comprising:
    a rotary member for mounting to and rotation with the shaft;
    a fluid actuated brake mechanism having a caliper for retarding the rotation of the rotary member and consequently shaft upon pressure build up in the brake mechanism;
    a bi-directional pump for conveying fluid from a reservoir, the pump being driven by rotation of the shaft; and
    a control manifold for circulating the fluid from the pump through the brake mechanism including the caliper, and back to the reservoir without pressure build up, the circulation of the fluid preventing the accumulation of gas in the brake mechanism and the caliper, when the shaft turns in the first direction and for directing fluid to the brake mechanism for activating the brake mechanism by fluid pressure build up to retard rotation of the shaft when the shaft turns in the reverse direction.

2. The brake assembly as defined in claim 1, wherein the control manifold includes means for circulating at least a portion of the fluid conveyed by the pump through the brake mechanism and back to the reservoir during rotation of the shaft in the first direction to prevent accumulation of gas in the brake mechanism.

3. The brake assembly as defined in claim 2, wherein the means for circulating circulates the fluid through both the brake mechanism and the manifold.

4. The brake assembly as defined in claim 3, wherein the means for circulating circulates the fluid during rotation of the shaft in both the first direction and the reverse direction; and the means for circulating further includes a means for controlling the flow of fluid through the brake mechanism during reverse rotation of the shaft for building up pressure in the brake mechanism to activate the brake mechanism and retard the reverse rotation shaft.

5. The brake assembly as claimed in claim 1, wherein the control manifold includes means for directing at least a portion of the fluid conveyed by the pump through the brake mechanism and back to the reservoir for flushing the brake mechanism and the control manifold, when the shaft turns in the first direction to prevent accumulation of gas, and for directing fluid to the brake mechanism while controlling flow through the brake mechanism to build up pressure in and activate the brake mechanism to retard rotation of the shaft when the shaft turns in the reverse direction.

6. The brake assembly as claimed in claim 1, wherein the rotary member is a brake disc and the brake mechanism caliper straddles the disc.

7. The brake assembly as claimed in claim 4, wherein the means for controlling the fluid flow is a fluid pressure regulating valve for automatically regulating fluid pressure in the brake mechanism for controlling the speed of reverse rotation of the shaft within a narrow regulatable range.

8. The brake assembly as claimed in claim 7, wherein the fluid pressure regulating valve is an adjustable valve of the constant flow control type.

9. A self-regulating brake assembly for controllably releasing reactive torque stored as torsion in an axially rotatable a shaft which is driven in a forward direction and rotates in a reverse direction during release of the torsion stored therein, the brake assembly comprising:
    a rotary member for rigidly connecting and axially rotating with a shaft;
    a fluid actuated brake mechanism for retarding rotation of the rotary member and consequently the shaft upon pressure build up in the brake mechanism, the break mechanism having a caliper;
    a bi-directional pump or conveying fluid from a reservoir, the pump being driven by rotation of the shaft;
    a control manifold for circulating the fluid from the pump through the brake mechanism and the caliper and back to the reservoir without pressure build up, the circulation of the fluid preventing accumulation of gas in the brake mechanism and the caliper, when the shaft is rotating in a forward direction an for controlling the flow of fluid through the brake mechanism during reverse rotation of the shaft for building up pressure in the brake mechanism to activate the brake mechanism and caliper and retard rotation of the shaft during reverse rotation of the shaft.

10. The self-regulating brake assembly as defined in claim 9, wherein the rotary member is a brake disk and the brake mechanism caliper straddles the disc.

11. The self-regulating brake assembly as defined in claim 10, wherein the control manifold includes a fluid pressure regulating valve for controlling fluid flow and for directing fluid from the brake mechanism to the reservoir for automatically regulating fluid pressure in the brake mechanism and thereby a retarding force generated by the braking mechanism for controlling the speed of reverse rotation of the shaft within a narrow regulatable range.

12. The self-regulating brake assembly as claimed in claim 11, wherein the fluid press regulating valve is an adjustable valve of the constant flow control type.

13. The self-regulating brake assembly as claimed in claim 9, wherein the control manifold includes
    a first fluid transmission circuit for continuously directing fluid from the bi-directional pump through the brake mechanism and back to the reservoir when the shaft is rotating; and
    a second fluid transmission circuit for controlling fluid flow through the brake mechanism when the torsion is released from the shaft during rotation in the reverse direction, to build up pressure in the brake mechanism for activation of the brake mechanism and retarding the reverse rotation.

14. The self-regulating brake assembly as claimed in claim 9, wherein the control manifold further includes a pressure relief valve for protecting the pump and the brake mechanism from excess fluid pressure.

15. The self-regulating brake assembly as claimed in claim 9, wherein the second fluid transmission circuit includes an adjustable fluid pressure regulating valve for automatically regulating fluid pressure in the brake mechanism for controlling the speed of reverse rotation of the shaft within a narrow regulatable range.

16. A self-regulating brake assembly for controllably releasing torsion due to reactive torque stored in a shaft for a down hole submersible pump in a well, which shaft is driven for rotation in a pump operating direction during operation of the pump and rotates in a reverse direction during release of the stored torsion, the brake assembly comprising:
   a rotary member for rigidly connecting with shaft for rotation therewith;
   a hydraulic fluid acruated brake mechanism for retarding rotation of the rotary member and consequently the shaft upon pressure build up in the brake mechanism, the break mechanism having a caliper;
   a bi-directional pump for conveying hydraulic fluid from a reservoir during rotation of the shaft;
   a control manifold for circulating the hydraulic fluid from the pump through the brake mechanism and caliper and back to the reservoir without pressure build up, the circulation of the hydraulic fluid preventing the accumulation of gas in the brake mechanism and caliper and for flushing the brake mechanism caliper when the shaft is rotating in the pump operating direction and for controlling the flow of the fluid through the brake mechanism to build up pressure in the brake mechanism to activate the brake mechanism when the shaft is rotating in the reverse direction.

17. The self-regulating brake assembly as defined in claim 16, wherein the pump conveys lubricating fluid from a reservoir to the brake mechanism and the manifold directs the fluid through brake mechanism and back into the reservoir, the reservoir being part of a well head structure for rotatably suspending the shaft and including a bearing arrangement housed in a lubricating fluid containing housing, the housing functioning as the fluid reservoir for the brake assembly.

18. The self-regulating brake assembly as claimed in claim 16, wherein the control manifold includes means to prevents fluid from passing through the brake mechanism and back to the reservoir when the shaft is rotating in the reverse direction.

19. The self-regulating brake assembly as claimed in claim 16, wherein the manifold directs fluid conveyed by the pump through the brake mechanism for flushing the brake mechanism when the shaft is rotating irrespective of the direction of rotation of the shaft, and reduces the flow of fluid through the brake mechanism and back to the fluid reservoir during reverse rotation of the shaft to build up pressure in the brake mechanism and activate the brake mechanism.

20. The self-regulating brake assembly as claimed in claim 16, wherein the rotary member is a brake disc and the brake mechanism caliper straddles the disc.

21. The self-regulating brake assembly as claimed in claim 17, wherein the rotary member is brake disc and the brake mechanism caliper straddles the disc, the brake disc being connected to the shaft just above a top end of the housing.

22. The self-regulating brake assembly as claimed in claim 17, further including a fluid filter for cleaning the fluid prior to return thereof to the reservoir.

23. The self-regulating brake assembly as claimed in claim 17, wherein the control manifold includes
   a) a first fluid transmission circuit directing fluid from the bi-directional pump back to the reservoir when the shaft is rotating in the pump operating direction;
   b) a second fluid transmission circuit connected in parallel to the first fluid transmission circuit for transmitting fluid through the brake mechanism and back to the reservoir when the shaft is rotating in the pump operating direction; and
   c) a third fluid transmission circuit for directing fluid from the pump to the brake mechanism and for controlling the flow of fluid through the brake mechanism when the shaft is rotating in the reverse direction, so that a pressure build up occurs in the brake mechanism thereby activating the brake mechanism.

24. The self-regulating brake assembly as claimed in claim 16, wherein the control manifold further comprises a pressure relief valve to protect the pump and the brake mechanism from excessive fluid pressure.

25. The self-regulating brake assembly as claimed in claim 16, wherein a third fluid transmission circuit includes an adjustable fluid pressure regulating valve of the constant flow control type for controlling the pressure build up to control a speed of rotation of the shaft within a narrow preselected range when the shaft is rotated in the reverse direction.

* * * * *

UNITED STATES PATENT AND TRADEMARK OFFICE
CERTIFICATE OF CORRECTION

PATENT NO. : 6,786,309 B2
DATED : September 7, 2004
INVENTOR(S) : Minoru Saruwatari and Kevin Saruwatari It is certified that error appears in the above-identified patent and that said Letters Patent is hereby corrected as shown below:

Column 1,
Line 3, delete the word "filed" and insert therefor -- field --;

Column 11,
Line 35, insert -- the -- between the words "consequently" and "shaft";

Column 12,
Line 31, delete "or" and insert therefor -- for --;
Line 38, delete "an" and insert therefor -- and --;
Line 46, delete "disc" and insert therefor -- disk --;
Line 56, delete "press" and insert therefor -- pressure --.

Column 13,
Line 23, delete "acruated" and insert therefor -- actuated --;
Line 34, insert -- and -- between the words "mechanism" and "caliper";
Line 43, insert -- the -- between the words "through" and "brake";

Column 14,
Line 16, insert -- a -- between the words "is" and "brake".

Signed and Sealed this

First Day of March, 2005

JON W. DUDAS
*Director of the United States Patent and Trademark Office*